(12) United States Patent
Yi et al.

(10) Patent No.: US 10,814,932 B2
(45) Date of Patent: Oct. 27, 2020

(54) FRAME FOR BICYCLE (71) Applicant: Giant Manufacturing Co., Ltd., Taichung (TW)

(72) Inventors: Ching-Sung Yi, Taichung (TW); Shao-Chieh Liu, Taichung (TW); Tzu-Pin Wu, Taichung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 181 days.

(21) Appl. No.: 16/021,033

(22) Filed: Jun. 28, 2018

(65) Prior Publication Data
US 2019/0054974 A1    Feb. 21, 2019

(30) Foreign Application Priority Data
Aug. 17, 2017   (TW) .............................. 106127988 A (51) Int. Cl.
*B62K 25/28*    (2006.01)
*B62K 3/02*    (2006.01)

(52) U.S. Cl.
CPC .............. *B62K 25/286* (2013.01); *B62K 3/02* (2013.01)

(58) Field of Classification Search
CPC .................................................. B62K 25/286
USPC ................................................ 280/283, 284
See application file for complete search history.

(56) References Cited

U.S. PATENT DOCUMENTS

| | | | |
|---|---|---|---|
| 5,628,524 A * | 5/1997 | Klassen | B62K 25/286 280/283 |
| 6,926,298 B2 | 8/2005 | Ellsworth et al. | |
| 7,066,481 B1 * | 6/2006 | Soucek | B62K 25/286 280/284 |
| 7,216,883 B2 | 5/2007 | O'Connor | |
| 9,845,132 B2 * | 12/2017 | O'Connor | B62K 25/286 |
| 2003/0038450 A1 * | 2/2003 | Lam | B62K 25/286 280/284 |
| 2008/0067772 A1 * | 3/2008 | Weagle | B62K 25/286 280/124.134 |

(Continued)

FOREIGN PATENT DOCUMENTS

| CN | 2811142 | 8/2006 |
|---|---|---|
| CN | 101081635 | 12/2007 |

(Continued)

OTHER PUBLICATIONS

"Search Report of Europe Counterpart Application", dated Jan. 18, 2019, p. 1-p. 7.

(Continued)

*Primary Examiner* — Tony H Winner
(74) *Attorney, Agent, or Firm* — JCIPRNET (57) ABSTRACT

A frame for a bicycle includes a front frame, a rear frame, an upper linkage, and a shock absorber. The rear frame is pivoted to the front frame at a main pivot axis. The upper linkage is pivoted to the front frame at a first pivot axis and is pivoted to the rear frame at a second pivot axis. The shock absorber is pivoted to the upper linkage at a third pivot axis and is pivoted to the front frame. When a compression ratio of the shock absorber is in a range between 0% and 60%, a distance variation between a pivot location of the rear frame at the second pivot axis and a pivot location of the rear frame at the main pivot axis reaches a maximum value thereof.

13 Claims, 5 Drawing Sheets

(56) References Cited

U.S. PATENT DOCUMENTS

| | | | | |
|---|---|---|---|---|
| 2008/0303242 A1* | 12/2008 | O'Connor | ............ | B62K 25/286 |
| | | | | 280/284 |
| 2009/0072512 A1* | 3/2009 | Earle | .................... | B62K 25/286 |
| | | | | 280/283 |
| 2009/0261557 A1 | 10/2009 | Beale et al. | | |
| 2009/0315296 A1 | 12/2009 | Berthold | | |
| 2009/0322055 A1* | 12/2009 | Arraiz | .................. | B62K 25/286 |
| | | | | 280/284 |
| 2010/0156066 A1* | 6/2010 | O'Connor | ................ | B62K 3/04 |
| | | | | 280/283 |
| 2011/0233892 A1* | 9/2011 | Domahidy | ........... | B62K 25/286 |
| | | | | 280/284 |
| 2013/0093160 A1* | 4/2013 | Alsop | .................. | B62K 25/286 |
| | | | | 280/284 |
| 2015/0076791 A1 | 3/2015 | Colegrove et al. | | |
| 2015/0360743 A1* | 12/2015 | O'Connor | ............ | B62K 25/286 |
| | | | | 280/284 |
| 2019/0248443 A1* | 8/2019 | Yi | .......................... | B62K 25/30 |

FOREIGN PATENT DOCUMENTS

| | | | | |
|---|---|---|---|---|
| CN | 101081635 A | * | 12/2007 | ........... B62K 25/286 |
| CN | 205707088 | | 11/2016 | |
| DE | 202006012023 | | 10/2006 | |
| DE | 102013004896 | | 9/2014 | |
| EP | 1990266 | | 11/2008 | |

OTHER PUBLICATIONS

"Office Action of China Counterpart Application", dated Dec. 18, 2019, p. 1-p. 8.

* cited by examiner

FRAME FOR BICYCLE

CROSS-REFERENCE TO RELATED APPLICATION

This application claims the priority benefit of Taiwan application serial no. 106127988, filed on Aug. 17, 2017. The entirety of the above-mentioned patent application is hereby incorporated by reference herein and made a part of this specification.

BACKGROUND OF THE INVENTION

Field of the Invention

The invention relates to a frame for a bicycle, and in particular, to a frame for a bicycle having a shock-absorbing function.

Description of Related Art

To adapt to rugged road surfaces, a frame for a bicycle may be integrated with a shock absorber to provide adequate buffering. To integrate the shock absorber with the frame, it is required to design a plurality of pivots on the frame. However, during the shock absorbing process, it is difficult to avoid deformation of the frame. As time passes, fatigue of the frame is increased, and a lifetime of the frame is thus reduced.

SUMMARY OF THE INVENTION

The invention provides a frame for a bicycle for reducing fatigue of the frame and thereby enhancing a lifetime of the frame.

The frame for a bicycle of the invention includes a front frame, a rear frame, an upper linkage, and a shock absorber. The rear frame is pivoted to the front frame at a main pivot axis. The upper linkage is pivoted to the front frame at a first pivot axis and is pivoted to the rear frame at a second pivot axis. The shock absorber is pivoted to the upper linkage at a third pivot axis and is pivoted to the front frame. When a compression ratio of the shock absorber is 0%, a distance variation between a pivot location of the rear frame at the second pivot axis and a pivot location of the rear frame at the main pivot axis is 0. When the compression ratio of the shock absorber is in a range between 0% and 60%, the distance variation between the pivot location of the rear frame at the second pivot axis and the pivot location of the rear frame at the main pivot axis reaches a maximum value thereof.

In an embodiment of the invention, the shock absorber is pivoted to the front frame at the main pivot axis.

In an embodiment of the invention, the front frame includes a seat tube and a down tube, the rear frame includes a seat stay and a chain stay, the seat stay is fixed to the chain stay at a rear wheel center, the chain stay is pivoted to the down tube at the main pivot axis, the upper linkage is pivoted to the seat tube at the first pivot axis and is pivoted to the seat stay at the second pivot axis, the shock absorber is pivoted to the down tube, when the compression ratio of the shock absorber is 0%, a distance variation between a pivot location of the seat stay at the second pivot axis and a pivot location of the chain stay at the main pivot axis is 0, and when the compression ratio of the shock absorber is in the range between 0% and 60%, the distance variation between the pivot location of the seat stay at the second pivot axis and the pivot location of the chain stay at the main pivot axis reaches a maximum value thereof.

In an embodiment of the invention, the shock absorber is pivoted to the down tube at the main pivot axis.

In an embodiment of the invention, when the compression ratio of the shock absorber is in a range between 40% and 60%, the distance variation between the pivot location of the rear frame at the second pivot axis and the pivot location of the rear frame at the main pivot axis reaches the maximum value thereof.

In an embodiment of the invention, when the compression ratio of the shock absorber is in a range between 45% and 55%, the distance variation between the pivot location of the rear frame at the second pivot axis and the pivot location of the rear frame at the main pivot axis reaches the maximum value thereof.

In an embodiment of the invention, when the compression ratio of the shock absorber is 50%, the distance variation between the pivot location of the rear frame at the second pivot axis and the pivot location of the rear frame at the main pivot axis reaches the maximum value thereof.

In an embodiment of the invention, when the compression ratio of the shock absorber is 0%, the distance variation between the pivot location of the rear frame at the second pivot axis and the pivot location of the rear frame at the main pivot axis is 0.

In an embodiment of the invention, when the compression ratio of the shock absorber is 100%, the distance variation between the pivot location of the rear frame at the second pivot axis and the pivot location of the rear frame at the main pivot axis is 0.

In an embodiment of the invention, when the distance variation between the pivot location of the rear frame at the second pivot axis and the pivot location of the rear frame at the main pivot axis reaches the maximum value thereof, projections of the main pivot axis, the first pivot axis, and the second pivot axis on a geometric plane are located on a same straight line.

In an embodiment of the invention, a distance between the pivot location of the rear frame at the main pivot axis and the pivot location of the rear frame at the second pivot axis is equal to a distance between projections of the main pivot axis and the second pivot axis on a geometric plane, a distance between projections of the main pivot axis and the second pivot axis on the geometric plane is a first distance when the compression ratio of the shock absorber is 0%, a distance between projections of the main pivot axis and the second pivot axis on the geometric plane is a second distance when the shock absorber is compressed and projections of the main pivot axis, the first pivot axis and the second pivot axis on the geometric plane located on a same straight line, and the second distance minus the first distance is less than 4 mm.

In an embodiment of the invention, a distance between projections of the main pivot axis and the second pivot axis on a geometric plane under the compression ratio of the shock absorber is 60% is less than a distance between projections of the main pivot axis and the second pivot on the geometric plane under the compression ratio of the shock absorber is 35%.

In light of the above, in the invention, the compression ratio of the shock absorber is set by configuring the distance variation of the rear frame at the first pivot axis and the second pivot axis to reach the maximum value thereof, so as to reduce fatigue of the frame and thereby enhance the lifetime of the frame.

To provide a further understanding of the aforementioned and other features and advantages of the disclosure, exemplary embodiments, together with the reference drawings, are described in detail below.

DESCRIPTION OF THE EMBODIMENTS

Figure 1:
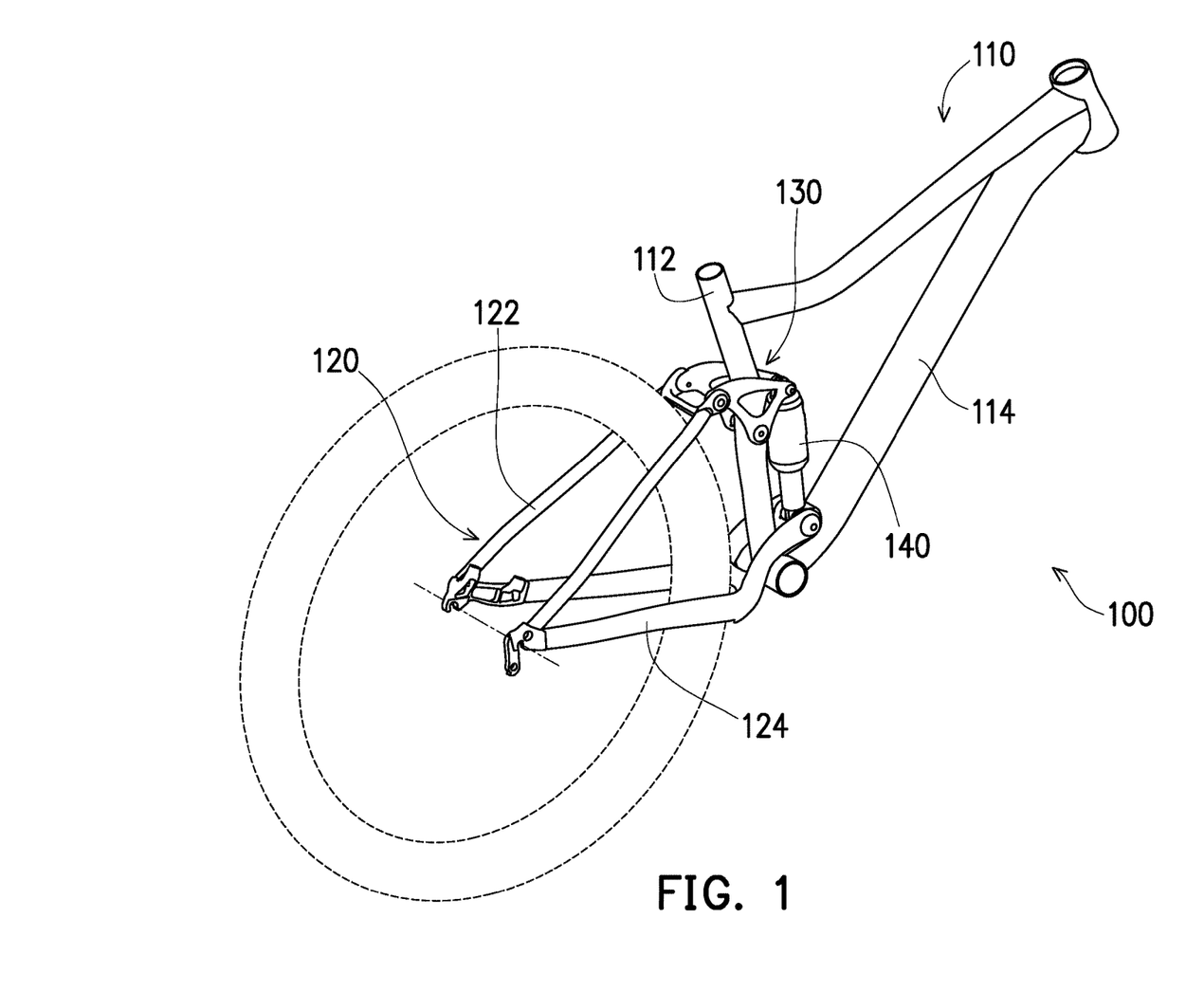
FIG. 1 is a perspective view illustrating a frame for a bicycle according to an embodiment of the invention.
Figure 2A:
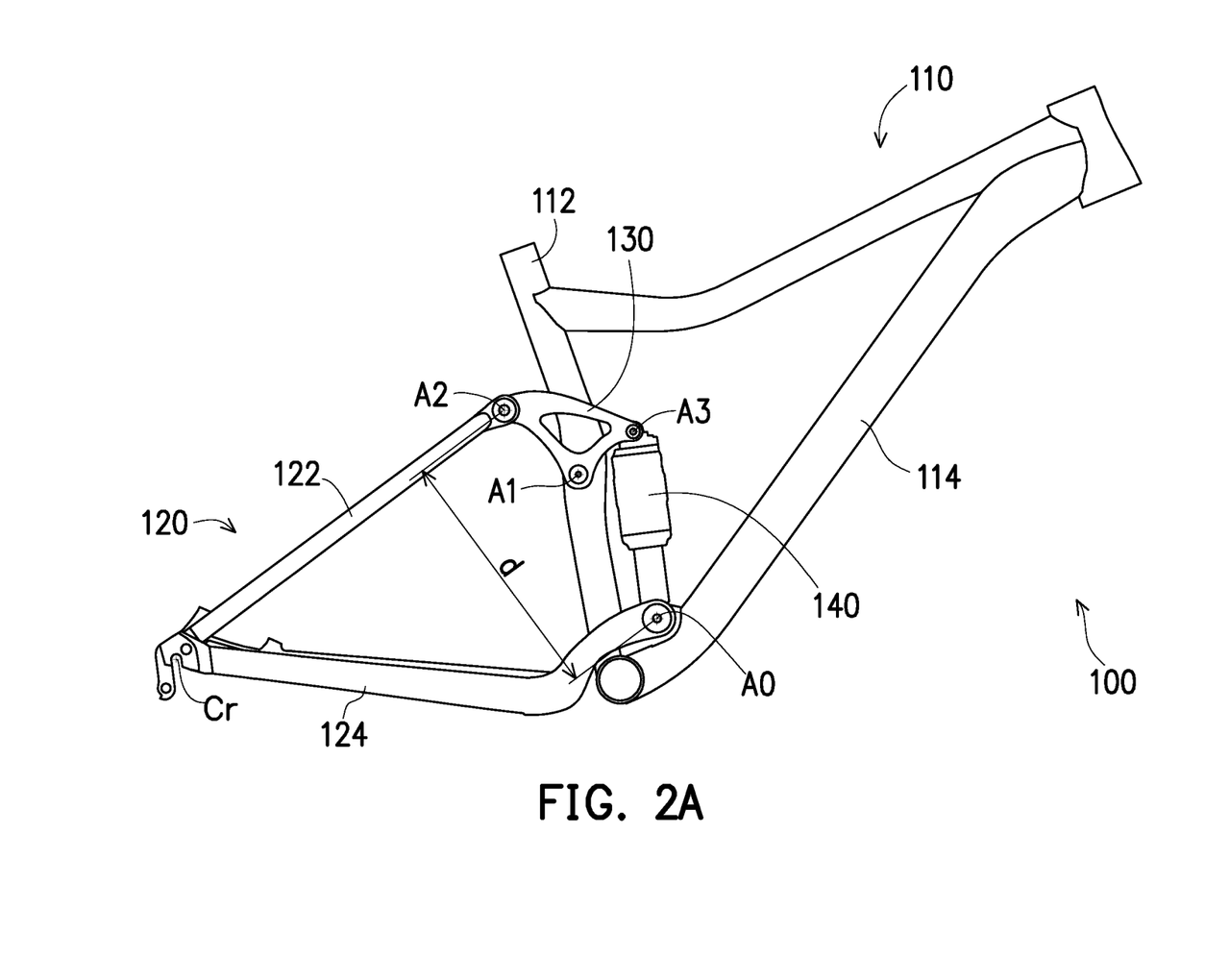
FIG. 2A is a side view illustrating the frame for a bicycle of FIG. 1 with a shock absorber in an uncompressed state.

Referring to FIG. 1 and FIG. 2A, in the present embodiment, a frame 100 for a bicycle includes a front frame 110, a rear frame 120, an upper linkage 130, and a shock absorber 140. The rear frame 120 is pivoted to the front frame 110 at a main pivot axis A0. The upper linkage 130 is pivoted to the front frame 110 at a first pivot axis A1 and is pivoted to the rear frame 120 at a second pivot axis A2. The shock absorber 140 is pivoted to the upper linkage 130 at a third pivot axis A3 and is pivoted to the front frame 110. When a compression ratio of the shock absorber 140 is 0%, a distance variation between a pivot location of the rear frame 120 at the second pivot axis A2 and a pivot location of the rear frame 120 at the main pivot axis A0 is 0. When the compression ratio of the shock absorber 140 is in a range between 0% and 60%, the distance variation between the pivot location of the rear frame 120 at the second pivot axis A2 and the pivot location of the rear frame 120 at the main pivot axis A0 reaches a maximum value thereof.

It is noted that when the compression ratio of the shock absorber 140 exceeds 60%, the rear frame 120 is subject to a greater force. At this time, if a deformation of the rear frame 120 (i.e., the distance variation between the pivot location of the rear frame 120 at the second pivot axis A2 and the pivot location of the rear frame 120 at the main pivot axis A0) also reaches a maximum value thereof, the rear frame 120 may be damaged. Therefore, in the present embodiment, when the compression ratio of the shock absorber 140 is in the range between 0% and 60%, the deformation of the rear frame 120 (i.e., the distance variation between the pivot location of the rear frame 120 at the second pivot axis A2 and the pivot location of the rear frame 120 at the main pivot axis A0) already reaches the maximum value thereof, so fatigue of the frame 100 (especially the rear frame 120) can be reduced to enhance a lifetime of the frame 100.

Referring to FIG. 1 and FIG. 2A, specifically, the front frame 110 includes a seat tube 112 and a down tube 114. The rear frame 120 includes a seat stay 122 and a chain stay 124. The seat stay 122 is fixed to the chain stay 124 at a rear wheel center Cr, and the chain stay 124 is pivoted to the down tube 114 at the main pivot axis A0. The upper linkage 130 is pivoted to the seat tube 112 at the first pivot axis A1 and is pivoted to the seat stay 122 at the second pivot axis A2. The shock absorber 140 is pivoted to the upper linkage 130 at the third pivot axis A3 and is pivoted to the down tube 114.

Referring to FIG. 1 and FIG. 2A, in the embodiment, the shock absorber 140 may be pivoted to the front frame 110 at the main pivot axis A0. Specifically, the shock absorber 140 may be pivoted to the down tube 114 of the front frame 110 at the main pivot axis A0. Since the shock absorber 140 is pivoted at the main pivot axis A0 where the rear frame 110 is also pivoted, the structure of the frame 100 can be made simpler.

Figure 3:
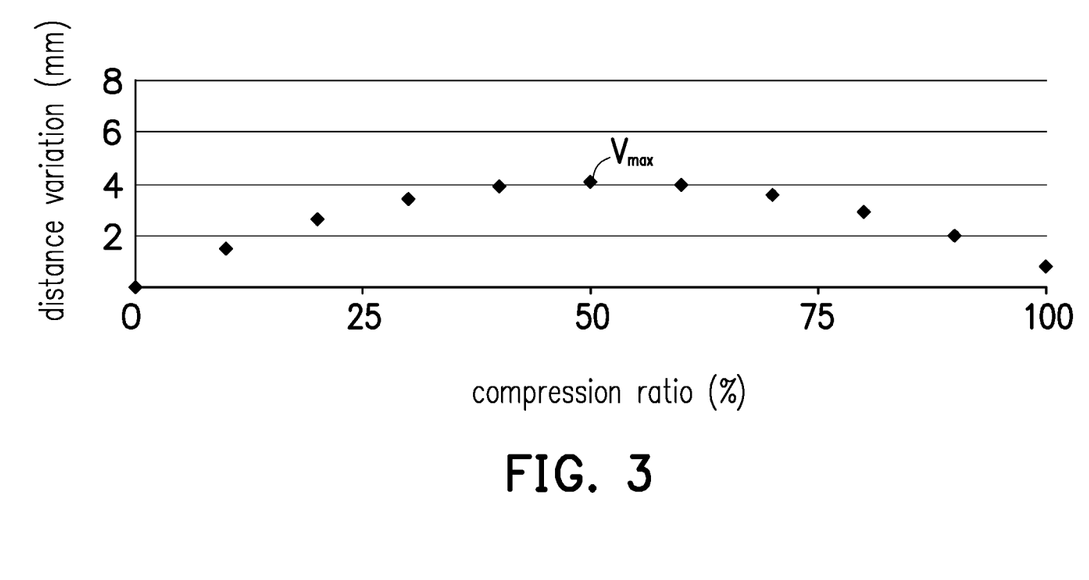
FIG. 3 is a diagram illustrating a relation between a compression ratio of the shock absorber and a distance variation of a rear frame at a first pivot axis and a second pivot axis of the frame for a bicycle of FIG. 1.

Referring to FIG. 2A and FIG. 3, when the shock absorber 140 is not compressed (namely, when the compression ratio of the shock absorber 140 is 0%), a distance variation between a pivot location of the seat stay 122 at the second pivot axis A2 and a pivot location of the chain stay 124 at the main pivot axis A0 is 0.

Figure 2B:
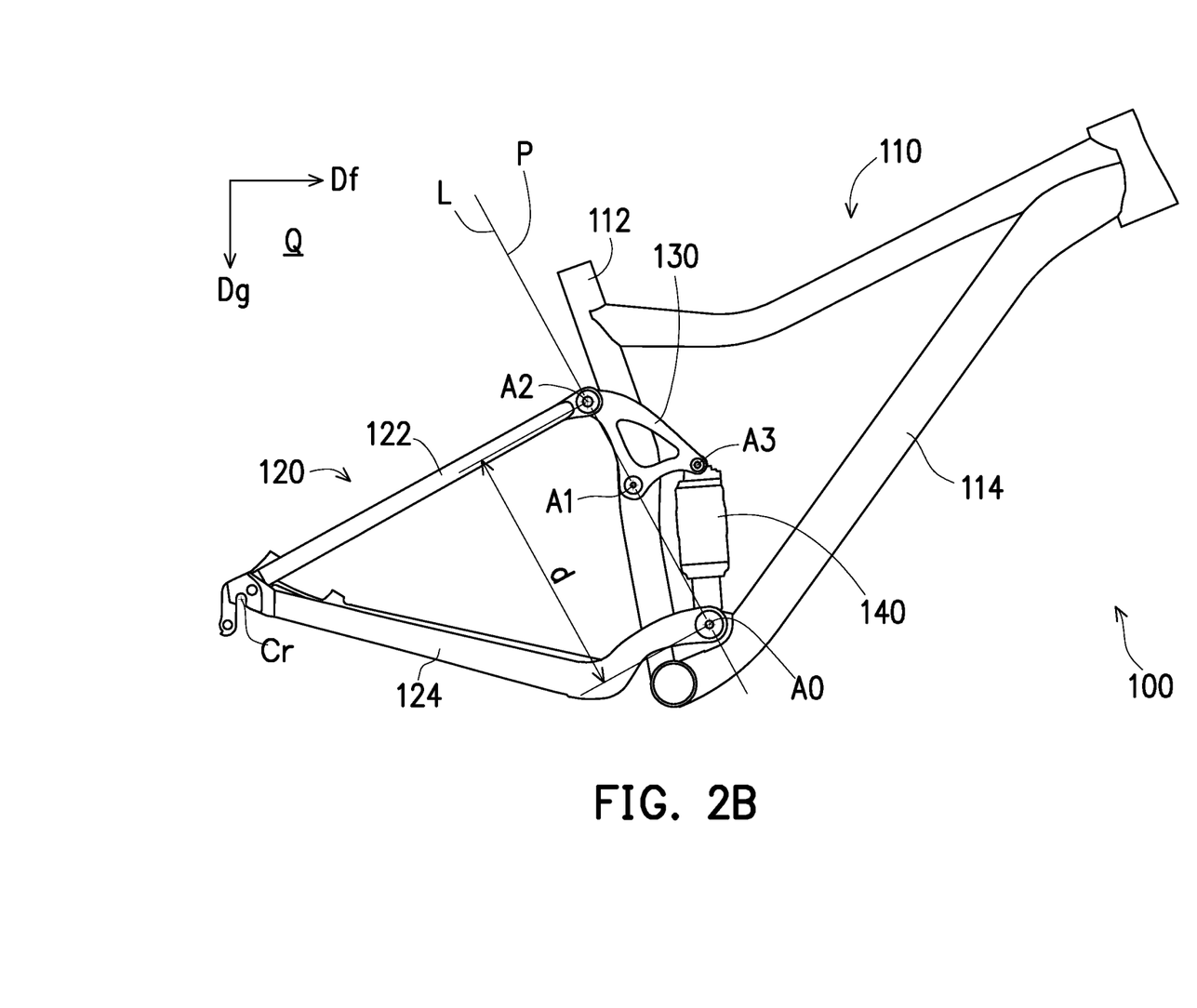
FIG. 2B is a side view illustrating the frame for a bicycle of FIG. 1 with the shock absorber in a compressed state.

Referring to FIG. 2B and FIG. 3, when the shock absorber 140 is being compressed (namely, when the compression ratio of the shock absorber 140 is in the range between 0% and 60%), the distance variation between the pivot location of the seat stay 122 at the second pivot axis A2 and the pivot location of the chain stay 124 at the main pivot axis A0 is increased to a maximum value Vmax thereof (e.g., 4 mm).

Figure 2C:
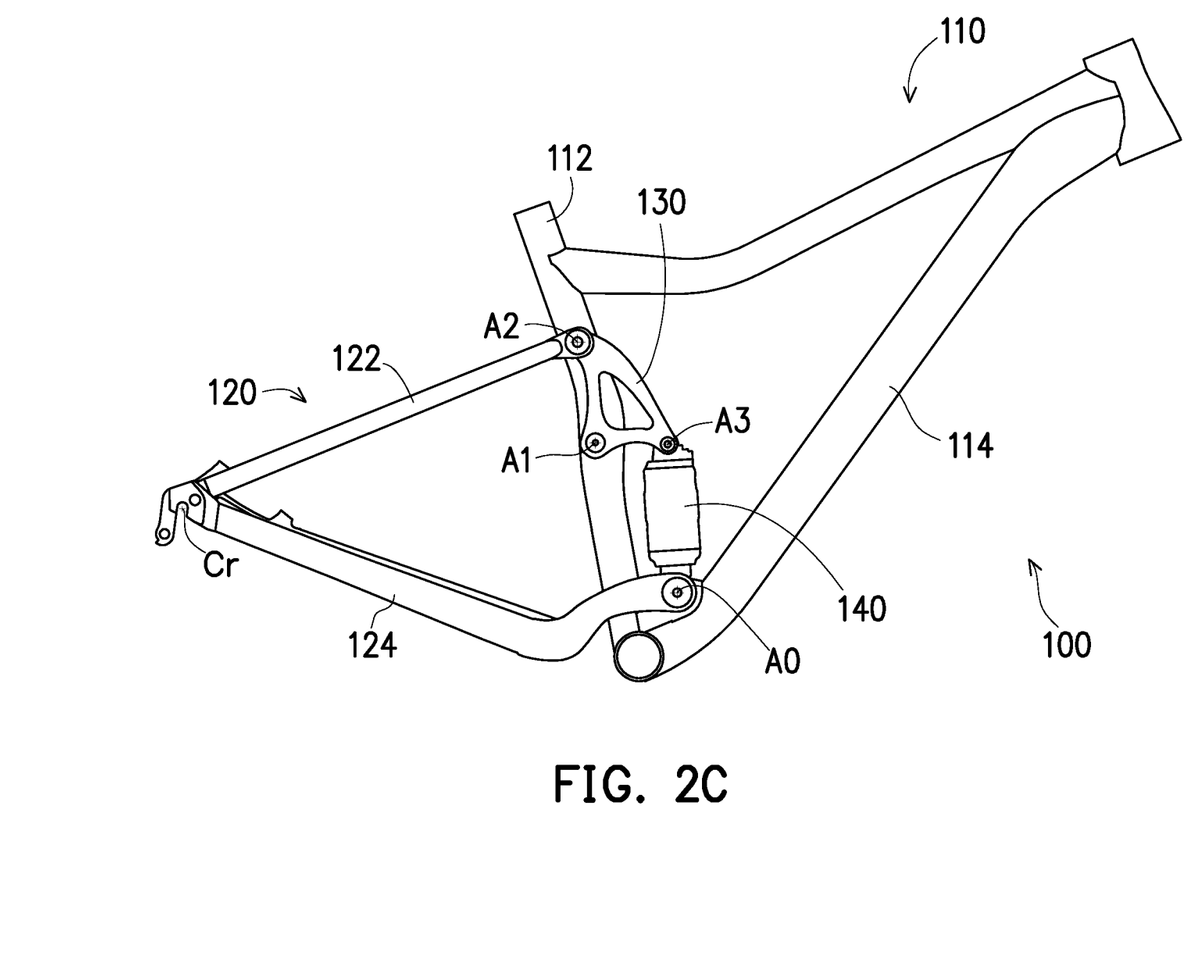
FIG. 2C is a side view illustrating the frame for a bicycle of FIG. 1 with the shock absorber in a fully compressed state.

Referring to FIG. 2C and FIG. 3, when the shock absorber 140 is fully compressed (namely, when the compression ratio of the shock absorber 140 is 100%), the distance variation between the pivot location of the seat stay 122 at the second pivot axis A2 and the pivot location of the chain stay 124 at the main pivot axis A0 is reduced to extremely close to 0. In another embodiment, the distance variation may also be reduced to 0.

In the present embodiment, as shown in FIG. 3, as the compression ratio of the shock absorber 140 increases from 0% to 100%, the distance variation between the pivot location of the seat stay 122 at the second pivot axis A2 and the pivot location of the chain stay 124 at the main pivot axis A0 first increases and then decreases, namely, in a way similar to a tendency of an arc line bending upwards. When the compression ratio of the shock absorber 140 is 0%, the distance variation between the pivot location of the seat stay 122 at the second pivot axis A2 and the pivot location of the chain stay 124 at the main pivot axis A0 is 0. When the compression ratio of the shock absorber 140 is 100%, the distance variation between the pivot location of the seat stay 122 at the second pivot axis A2 and the pivot location of the chain stay 124 at the main pivot axis A0 is 0 or extremely close to 0.

In the present embodiment, when the compression ratio of the shock absorber 140 is in the range between 0% and 60%, the distance variation between the pivot location of the rear frame 120 (i.e., the seat stay 122) at the second pivot axis A2 and the pivot location of the rear frame 120 (i.e., the chain stay 124) at the main pivot axis A0 reaches the maximum value Vmax thereof.

In another embodiment, when the compression ratio of the shock absorber 140 is in a range between 40% and 60%, the distance variation between the pivot location of the rear frame 120 (i.e., the seat stay 122) at the second pivot axis A2 and the pivot location of the rear frame 120 (i.e., the chain stay 124) at the main pivot axis A0 reaches the maximum value Vmax thereof.

In another embodiment, when the compression ratio of the shock absorber 140 is in a range between 45% and 55%, the distance variation between the pivot location of the rear frame 120 (i.e., the seat stay 122) at the second pivot axis A2 and the pivot location of the rear frame 120 (i.e., the chain stay 124) at the main pivot axis A0 reaches the maximum value Vmax thereof.

In another embodiment, when the compression ratio of the shock absorber 140 is 50%, the distance variation between the pivot location of the rear frame 120 (i.e., the seat stay 122) at the second pivot axis A2 and the pivot location of the rear frame 120 (i.e., the chain stay 124) at the main pivot axis A0 reaches the maximum value Vmax thereof.

In the present embodiment, as shown in FIG. 2B, when the distance variation between the pivot location of the rear frame 120 (i.e., the seat stay 122) at the second pivot axis A2 and the pivot location of the rear frame 120 (i.e., the chain stay 124) at the main pivot axis A0 reaches the maximum value Vmax thereof, the main pivot axis A0, the first pivot axis A1, and the second pivot axis A2 may be located on the same geometric plane P. In other words, when the distance variation between the pivot location of the rear frame 120 (i.e., the seat stay 122) at the second pivot axis A2 and the pivot location of the rear frame 120 (i.e., the chain stay 124) at the main pivot axis A0 reaches the maximum value Vmax thereof, projections of the main pivot axis A0, the first pivot axis A1, and the second pivot axis A2 on another geometric plane Q different from the geometric plane P may be located on the same straight line L. For example, this geometric plane Q is a geometric plane on which the drawing sheet is located. Alternatively, this geometric plane Q may be located on a geometric plane formed by a forward direction Df and a gravity direction Dg, wherein the forward direction Df refers to a direction in which a bicycle adopting the frame 100 travels forward, and the gravity direction Dg refers to a direction of the gravity force to which the bicycle adopting the frame 100 is subjected. Moreover, this geometric plane Q may also be a geometric plane on which the front frame 110 is located.

Referring to FIG. 2A and FIG. 2B, in the present embodiment, a distance between the pivot location of the rear frame 120 (i.e., the seat stay 122) at the main pivot axis A0 and the pivot location of the rear frame 120 (i.e., the chain stay 124) at the second pivot axis A2 may be equal to the main pivot axis A0 and the second axis A2 is equal to a distance d between projections of the main pivot axis A0 and the second pivot axis A2 on the geometric plane Q. A distance between projections of the main pivot axis A0 and the second pivot axis A2 on the geometric plane Q is a first distance when the compression ratio of the shock absorber 140 is 0%. A distance between projections of the main pivot axis A0 and the second pivot axis A2 on the geometric plane Q is a second distance when the shock absorber 140 is compressed and projections of the main pivot axis A0, the first pivot axis and the second pivot axis A2 on the geometric plane Q located on the same straight line L. The second distance minus the first distance is less than 4 mm.

Referring to FIG. 2B and FIG. 3, in the present embodiment, a distance between projections of the main pivot axis A0 and the second pivot axis A2 on a geometric plane Q under the compression ratio of the shock absorber 140 is 60% may be less than a distance between projections of the main pivot axis A0 and the second pivot A2 on the geometric plane Q under the compression ratio of the shock absorber 140 is 35%.

Referring to FIG. 2A and FIG. 3, during the compression of the shock absorber 140, the required force becomes greater and greater. If the maximum deformation of the frame (i.e., the maximum distance variation) occurs in the rear stage of the compression ration of the shock absorber 140, large forces and large deformations will significantly shorten the life of the frame. Therefore, the maximum value Vmax of the distance variation can be set in the front stage (i.e., 0% to 60%) of the compression ratio of the shock absorber 140, which helps to extend the frame life. In addition, the maximum value Vmax of the distance variation falls on 50% of the compression ratio of the shock absorber 140, which contributes to the balance of both sides of the relationship curve, so that the maximum value of the distance variation can be made lower.

In summary of the above, in the invention, the compression ratio of the shock absorber is set by configuring the distance variation of the rear frame at the first pivot axis and the second pivot axis to reach the maximum value thereof, so as to reduce fatigue of the frame and thereby enhance the lifetime of the frame.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A frame for a bicycle comprising:
   a front frame;
   a rear frame pivoted to the front frame at a main pivot axis;
   an upper linkage pivoted to the front frame at a first pivot axis and pivoted to the rear frame at a second pivot axis; and
   a shock absorber pivoted to the upper linkage at a third pivot axis and pivoted to the front frame, wherein when a compression ratio of the shock absorber is in a range between 0% and 60%, a distance variation between a pivot location of the rear frame at the second pivot axis and a pivot location of the rear frame at the main pivot axis reaches a maximum value thereof.

2. The frame for a bicycle according to claim 1, wherein the shock absorber is pivoted to the front frame at the main pivot axis.

3. The frame for a bicycle according to claim 1, wherein the front frame comprises a seat tube and a down tube, the rear frame comprises a seat stay and a chain stay, the seat stay is fixed to the chain stay at a rear wheel center, the chain stay is pivoted to the down tube at the main pivot axis, the upper linkage is pivoted to the seat tube at the first pivot axis and is pivoted to the seat stay at the second pivot axis, the shock absorber is pivoted to the down tube, and when the compression ratio of the shock absorber is in the range between 0% and 60%, a distance variation between a pivot location of the seat stay at the second pivot axis and a pivot location of the chain stay at the main pivot axis reaches a maximum value thereof.

4. The frame for a bicycle according to claim 3, wherein the shock absorber is pivoted to the down tube at the main pivot axis.

5. The frame for a bicycle according to claim 1, wherein when the compression ratio of the shock absorber is in a range between 40% and 60%, the distance variation between the pivot location of the rear frame at the second pivot axis and the pivot location of the rear frame at the main pivot axis reaches the maximum value thereof.

6. The frame for a bicycle according to claim 1, wherein when the compression ratio of the shock absorber is in a range between 45% and 55%, the distance variation between the pivot location of the rear frame at the second pivot axis and the pivot location of the rear frame at the main pivot axis reaches the maximum value thereof.

7. The frame for a bicycle according to claim 1, wherein when the compression ratio of the shock absorber is 50%, the distance variation between the pivot location of the rear frame at the second pivot axis and the pivot location of the rear frame at the main pivot axis reaches the maximum value thereof.

8. The frame for a bicycle according to claim 1, wherein when the compression ratio of the shock absorber is 0%, the distance variation between the pivot location of the rear frame at the second pivot axis and the pivot location of the rear frame at the main pivot axis is 0.

9. The frame for a bicycle according to claim 8, wherein when the compression ratio of the shock absorber is 100%, the distance variation between the pivot location of the rear frame at the second pivot axis and the pivot location of the rear frame at the main pivot axis is 0.

10. The frame for a bicycle according to claim 1, wherein when the distance variation between the pivot location of the rear frame at the second pivot axis and the pivot location of the rear frame at the main pivot axis reaches the maximum value thereof, the main pivot axis, the first pivot axis, and the second pivot axis are located on a same geometric plane.

11. The frame for a bicycle according to claim 1, wherein when the distance variation between the pivot location of the rear frame at the second pivot axis and the pivot location of the rear frame at the main pivot axis reaches the maximum value thereof, projections of the main pivot axis, the first pivot axis, and the second pivot axis on a geometric plane are located on a same straight line.

12. The frame for a bicycle according to claim 1, wherein a distance between the pivot location of the rear frame at the main pivot axis and the pivot location of the rear frame at the second pivot axis is equal to a distance between projections of the main pivot axis and the second pivot axis on a geometric plane, the distance between projections of the main pivot axis and the second pivot axis on the geometric plane is a first distance when the compression ratio of the shock absorber is 0%, the distance between projections of the main pivot axis and the second pivot axis on the geometric plane is a second distance when the shock absorber is compressed and projections of the main pivot axis, the first pivot axis and the second pivot axis on the geometric plane located on a same straight line, and the second distance minus the first distance is less than 4 mm.

13. The frame for a bicycle according to claim 1, wherein a distance between projections of the main pivot axis and the second pivot axis on a geometric plane under the compression ratio of the shock absorber at 60% is less than the distance between projections of the main pivot axis and the second pivot axis on the geometric plane under the compression ratio of the shock absorber at 35%.

\* \* \* \* \*